(12) United States Patent
Drnevich

(10) Patent No.: US 7,427,368 B2
(45) Date of Patent: Sep. 23, 2008

(54) SYNTHESIS GAS AND CARBON DIOXIDE GENERATION METHOD

(75) Inventor: Raymond Francis Drnevich, Clarence Center, NY (US)

(73) Assignee: Praxair Technology, Inc., Danbury, CT (US)

( * ) Notice: Subject to any disclaimer, the term of this patent is extended or adjusted under 35 U.S.C. 154(b) by 658 days.

(21) Appl. No.: 11/204,203

(22) Filed: Aug. 16, 2005

(65) Prior Publication Data
US 2007/0041894 A1 Feb. 22, 2007

(51) Int. Cl.
*C01B 31/20* (2006.01)
*C01B 3/24* (2006.01)

(52) U.S. Cl. .................... 252/373; 423/437.1
(58) Field of Classification Search .............. 423/437.1; 252/373
See application file for complete search history.

(56) References Cited

U.S. PATENT DOCUMENTS

| | | | | |
|---|---|---|---|---|
| 4,364,915 | A * | 12/1982 | Proctor | 423/437.1 |
| 5,752,995 | A | 5/1998 | Kang | 48/198.7 |
| 5,888,272 | A | 3/1999 | Prasad et al. | 95/54 |
| 5,935,533 | A | 8/1999 | Kleefisch et al. | 422/211 |
| 5,997,596 | A | 12/1999 | Joshi et al. | 48/198.1 |
| 6,110,979 | A | 8/2000 | Nataraj et al. | 518/704 |
| 6,402,988 | B1 * | 6/2002 | Gottzmann et al. | 252/373 |
| 6,537,465 | B2 * | 3/2003 | Gottzmann et al. | 252/373 |
| 6,695,983 | B2 * | 2/2004 | Prasad et al. | 252/373 |
| 6,783,750 | B2 * | 8/2004 | Shah et al. | 423/652 |

OTHER PUBLICATIONS

Choudhary et al., "Simultaneous steam and $CO_2$ reforming of methane to syngas over NiO/MgO/SA-5205 in presence and absence of oxygen", Applied Catalysis A: General, 168 (1998) pp. 33-46.
Tjatopoulos et al., "Feasibility Analysis of Ternary Feed Mixtures of Methane with Oxygen, Steam, and Carbon Dioxide for the Production of Methanol Synthesis Gas", Industrial and Engineering Chemistry Research, vol. 37, No. 4 (1998) pp. 1410-1421.
Switzer et al., "Cost and Feasibility Study on the Praxair Advanced Boiler for the $CO_2$ Capture Project's Refinery Scenario", from the $CO_2$ Results from the Capture Project, vol. 1 (2005).

* cited by examiner

Primary Examiner—Wayne Langel
(74) Attorney, Agent, or Firm—David M. Rosenblum

(57) ABSTRACT

A method of generating a synthesis gas product stream and carbon dioxide in which a fuel is combusted in an oxygen transport membrane combustor to produce a flue gas stream containing the carbon dioxide and water. Reforming duty is divided between a combined reforming process and a gas heated reformer to produce the product stream. The flue gas stream is used to supply heat to a primary, steam methane reforming stage of the combined reforming process. Residual methane, produced in the primary stage, is reacted in a secondary stage having an oxygen transport membrane reactor. Heat produced in the secondary stage is supplied to the gas heated reactor to support its operation. The flue gas stream is cooled and water is separated therefrom to produce the carbon dioxide at a concentration of at least 85 mol percent.

7 Claims, 2 Drawing Sheets

SYNTHESIS GAS AND CARBON DIOXIDE GENERATION METHOD

FIELD OF THE INVENTION

The present invention relates to a method of generating a synthesis gas product stream and carbon dioxide in which hydrocarbons and steam are reacted in a combined reforming process and in a gas heated reformer. More particularly, the present invention relates to such a method in which heat is supplied to a primary steam methane reforming stage of the combined reforming process by a flue gas stream that contains the carbon dioxide and heat is supplied to the gas heated reformer from a secondary catalytic partial oxidation stage of the combined reforming process. Even more particularly, the present invention relates to such a method in which oxygen transport membranes are employed in a combustor to generate the flue gas and in the secondary catalytic partial oxidation stage.

BACKGROUND OF THE INVENTION

Synthesis gases are conventionally produced by conducting an endothermic steam methane reforming reaction within a steam methane reformer. A steam methane reformer has a radiant section containing catalyst filled tubes to react a hydrocarbon containing reactant and steam and a convective section in which heat is recovered from the flue gas for such purposes as generating the steam. The heat required to support the endothermic reforming reaction is produced by burners that project flames into the radiant section of the reformer.

There are advantages to generating synthesis gases in a combined reforming process that utilize a primary reforming stage that can be formed of a conventional fired steam methane reformer, as described above, and a secondary reforming stage that can incorporate an oxygen transport membrane reactor to react residual methane with oxygen separated from an oxygen containing gas through oxygen ion transport. Such a system is described in U.S. Pat. No. 6,110,979. In this patent, a steam and hydrocarbon containing feed is heated and introduced into a steam methane reformer. The partially reformed feed is then introduced into an oxygen transport membrane reactor to produce a synthesis gas stream that is further processed to recover hydrogen.

The problem with typical combined reforming systems, including such systems that utilize an oxygen transport membrane reactor, is that the carbon dioxide produced by the requisite firing to generate the heat necessary to support the endothermic reforming reaction is simply discharged to the environment as stack gases. In addition to the possible environmental problems presented by such operation, the carbon dioxide itself is a valuable product that can be used in a variety of products and industrial processes, for example, carbon dioxide enhanced oil recovery.

It is to be noted that it has been suggested in the art to use an oxygen transport membrane, such as illustrated in U.S. Pat. No. 5,888,272, to generate a heated combustion gas stream to supply heat to a downstream process that requires heat. Oxygen transport membrane separate oxygen from the oxygen containing feed through use of a ceramic material that at elevated temperatures will conduct oxygen ions. When a driving force such as a partial pressure differential is applied to such a material, oxygen will ionize at one surface of the material or more properly, membrane. The oxygen ions are transported through the membrane and emerge at the other side to recombine into elemental oxygen. As a result of such recombination, electrons are transported back through the membrane to ionize the oxygen. The oxygen partial pressure differential can be produced by combusting a fuel at the surface of the membrane at which the oxygen ions emerge and recombine.

The problem with utilizing an oxygen transport membrane to generate heated flue gases to supply heat to a steam methane reformer is that the burners normally used operate at adiabatic flame temperatures in excess of 1500° C. An oxygen transport membrane, however, cannot tolerate such temperature for an extended period of time without eventually suffering structural failure. A typical operational temperature range of an ion transport membrane is between about 400° C. and about 1200° C. Therefore, the use of an oxygen transport membrane for purposes that involve the heating of a steam methane reformer has proven to be impractical.

As will be discussed, the present invention provides a method in which an oxygen transport membrane combustion device is utilized to combust a fuel and generate a flue gas to supply heat to a steam methane reformer and to in turn allow carbon dioxide produced by the combustion to be easily separated and that does not require high, impractical operational temperatures for the oxygen transport membrane.

SUMMARY OF THE INVENTION

The present invention provides a method of generating a synthesis gas product stream and carbon dioxide. In accordance with the method, a fuel is combusted in an oxygen transport membrane combustor to produce a flue gas stream that contains carbon dioxide and water. In this regard, the term "oxygen transport membrane combustor" means a device that employs an oxygen transport membrane that separates oxygen from an oxygen containing gas through oxygen ion transport, generally through a substantially gas tight ceramic material and that supports combustion of the fuel through oxygen separated by such membrane through oxygen ion transport.

Part of a reactant stream, containing hydrocarbons and steam, is reacted in a combined reforming process and a remaining part of said reactant stream is reacted in a gas heated reformer to produce the synthesis gas product stream. The combined reforming process includes a primary stage having a steam methane reformer to react part of the hydrocarbons and steam and a secondary stage having an oxygen transport membrane reactor configured to react residual methane produced in the primary stage by catalytic partial oxidation. Heat is transferred from the flue gas stream to the primary stage and from the secondary stage to the gas heated reformer to support endothermic heat requirements of steam methane reforming reactions occurring within said primary stage and the gas heated reformer.

The flue gas stream is cooled and thereafter, the water is separated from the flue gas stream to produce the carbon dioxide at a concentration of at least 85 mol percent.

The flue gas stream would have approximately the same temperature as the operating temperature of the oxygen transport membrane combustor, which upon generation would have a temperature of between about 900° C. and about 1200° C. if the oxygen transport membrane contained within such a device is to operate within a conventional and tolerable temperature range. While, there may be potential to extend the reliable performance of oxygen transport membranes to 1400° C., such temperature would still be below the order of temperatures required in a steam methane reformer, typically in excess of 1500° C. Hence, the degree to which steam methane reforming can occur within the steam methane reformer is limited when a flue gas generated by an oxygen transport membrane combustor is used to supply the heat. This limitation is made up by taking up remaining reforming duty in the gas heated reformer. Heat required by the gas heated reformer is supplied at least in part by the catalytic partial oxidation occurring within the secondary stage.

It is to be further noted that since the flue gas stream has been produced by oxyfuel combustion occurring within the oxygen transport membrane combustor, it predominantly contains carbon dioxide and water. As such, the capture of the carbon dioxide product becomes an inexpensive proposition in that the flue gas stream can be cooled after having indirectly transferred heat to the first endothermic steam methane reforming reaction. The water then can be separated from the flue gas stream after having been cooled to allow the carbon dioxide to be further processed and purified or to be sequestered. In this regard, the flue gas stream can be sufficiently cooled to condense the water contained therein. The water can then be separated from the flue gas stream, by introducing the flue gas stream into a vessel, such as a knock-out drum, to collect the water.

The primary stage of the combined reforming process produces a first synthesis gas stream that is introduced into the oxygen transport membrane reactor of the secondary stage. The secondary stage in turn produces a second synthesis gas stream and the heat is transferred to the gas heated reformer by indirect heat exchange with the second synthesis gas stream.

Both the third synthesis gas stream and the first synthesis gas stream can be introduced into the catalytic oxygen transport membrane reaction. This reacts further residual methane present within the third synthesis gas stream along with the residual methane contained in the first synthesis gas stream. The second synthesis gas stream is obtained from such reactions. The synthesis gas product stream can then be formed from the second synthesis gas stream after having indirectly exchanged the additional heat to the steam methane reforming reactions being conducted in the gas heated reformer.

Alternatively, the third synthesis gas stream can be combined with the second synthesis gas stream prior to the second synthesis gas stream indirectly transferring the heat to the gas heated reformer. A combined synthesis gas stream is thereby obtained by the gas heated reformer and the synthesis gas product stream is produced from the combined synthesis gas stream.

BRIEF DESCRIPTION OF THE DRAWINGS

While the specification concludes with claims distinctly pointing out the subject matter that Applicants regard as their invention, it is believed that the invention would be better understood when taken in connection with the accompanying drawings in which:

DETAILED DESCRIPTION

Figure 1:
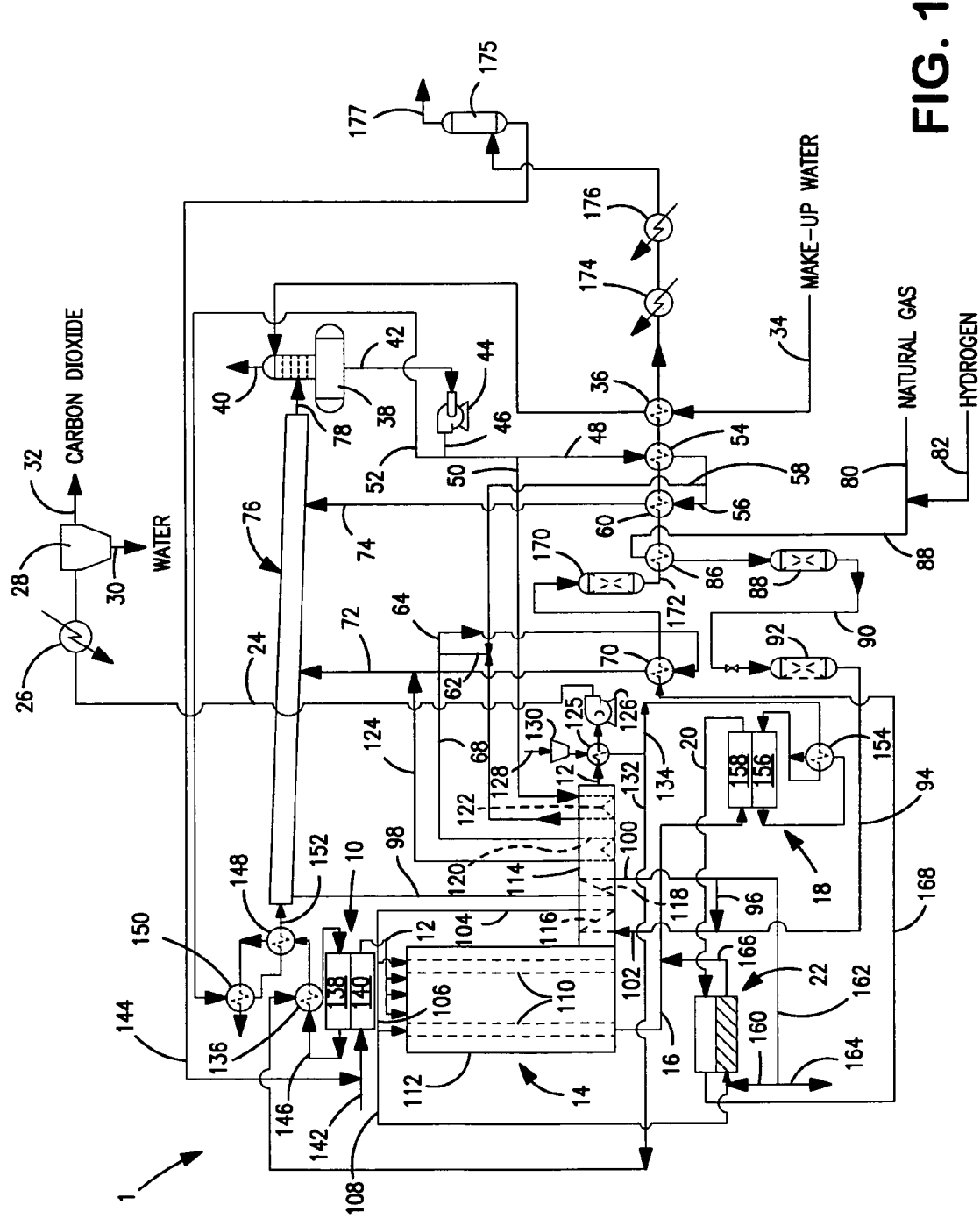
FIG. 1 is a schematic process flow diagram of an apparatus for carrying out a method in accordance with the present invention.

With reference to FIG. 1, a hydrogen production plant 1 is illustrated for carrying out a method in accordance with the present invention. In this regard, an oxygen transport membrane combustor 10 produces a flue gas stream 12 that is used to supply heat to a primary stage of combined reforming process that is formed by a steam methane reformer 14. FIG. 1 illustrates a case of co-current flue gas and process gas flows. Other arrangements such as countercurrent flow or "side fired" arrangements are possible. Steam methane reformer 14 produces a first synthesis gas stream 16. The flue gas stream 12 upon generation has a temperature of between about 900° C. and about 1200° C. and hence, the oxygen transport membrane employed in oxygen transport membrane combustor 10 can operate at conventional temperatures. The first synthesis gas stream 16 is further reacted in a second stage of the combined reforming process. The second stage is formed by an oxygen transport membrane reactor 18 and produces a second synthesis gas stream 20. Oxygen transport membrane reactor 18 contains a partial oxidation catalyst to partially oxidize residual methane contained in the first synthesis gas stream 16 into hydrogen and carbon monoxide and an oxygen transport membrane to supply the oxygen for the oxidation reactions. The second synthesis gas stream 20 supplies heat to a gas heated reformer 22.

The flue gas stream 12 after having supplied heat to primary steam methane reformer 14 is discharged as a flue gas stream 24 that is cooled in a conventional heat exchanger 26 that can employ cooling water for such purpose. After having been cooled, the flue gas stream 24 is introduced into knock-out drum or other vessel 28 to collect water 30 and to discharge the carbon dioxide stream 32. The carbon dioxide can be utilized as a product or part of the carbon dioxide can be mixed with the process feed 80 to the reformer when syngas, not hydrogen, is the preferred product. In such processing at least 85 percent purity by volume is possible. In a proper case, such separation and/or purification could be conducted with the use of a partial condensation system that can provide relatively pure carbon dioxide, typically above 95 percent. Such partial condensation employs compression and cooling steps followed by additional condensation and water removal by adsorption. The resultant stream can be further cooled and liquefied to produce liquid carbon dioxide that would be subsequently vaporized.

Although the present invention can be conducted in a variety of different ways and by a variety of equipment, it can be applied to a conventional plant designed to produce a synthesis gas for hydrogen separation, either as an original set-up or as a retrofit. In case of a conventional plant designed to produce hydrogen, steam can be generated in a conventional manner. To such end, a combination of make-up water and condensate, as a water stream 34, is heated in a heat exchanger 36 and then deaerated in a deaerator 38. Vapor is vented as a vent stream 40. Stream 78, consisting of steam, is used as a purge gas in deaerator 38. The deaerated water 42 is then pumped in a pump 44 to a pressure of approximately 765 psia for mixing with natural gas in the feed to be reformed or as required to produce superheated steam for export.

The pumped water 46 is divided into first, second and third subsidiary streams, 48, 50 and 52, respectively. First subsidiary stream 48 is heated in a heat exchanger 54 to near boiling temperature. Second subsidiary stream 50, as will be discussed, is heated within convective section 114 of steam methane reformer 14. First subsidiary stream 48, after having been heated within heat exchanger 54, is divided into streams 56 and 58. Stream 56 is introduced into a heat exchanger 60 and thereby boils. Stream 58 is combined with second subsidiary stream 50 after having been heated in convective section 114 of steam methane reformer 14 to produce a combined stream 62. Combined stream 62 is then divided into streams 64 and 68. Stream 68, is introduced into the convective section 114 of stream methane reformer 14 and thereby vaporizes. Stream 64 is introduced into a heat exchanger 70 to be vaporized.

Stream 64 after having boiled within heat exchanger 70 is combined with stream 68 of saturated steam, after having been boiled within primary steam methane reformer 14, to form a steam stream 72. Stream 56 after having been boiled within heat exchanger 60 produces a steam stream 74. Steam streams 72 and 74 are then introduced into a steam header 76. A small portion of the steam within steam header 76 is sent as stream 78 into deaerator 38.

A natural gas stream 80, as a hydrocarbon containing reactant, is combined with a hydrogen stream 82 in a molar ratio of about 35:1. The resultant reactant stream 84 is then heated within heat exchanger 86 and then hydro treated in a hydrotreater 88 to convert organic sulfur species to hydrogen sulfide. The treated stream 90 is introduced into zinc oxide bed 92 to remove the hydrogen sulfide. The resulting stream 94 is then combined with a steam stream 96. Steam stream 96 is produced as a steam stream 98 from steam header 76 and is superheated within steam methane reformer 14 to produce a steam stream 100 from which steam stream 96 is derived. The resultant combined reactant stream 102, containing both hydrocarbons and steam, is then heated within convective section 114 of steam methane reformer 14 to produce a heated hydrocarbon containing reactant stream 104.

The heated hydrocarbon containing reactant stream 104 is subdivided into a first hydrocarbon containing reactant stream 106 and a second hydrocarbon containing reactant stream 108. First hydrocarbon containing reactant stream 106 is introduced into a catalyst filled tubes 110 contained within a radiant section 112 of steam methane reformer 14. The hydrocarbons contained within first hydrocarbon containing stream 106 react with steam to produce first synthesis gas stream 16. As indicated above, heat is supplied to support the endothermic steam methane reforming reaction via flue gas stream 12.

After having supplied heat to reformer tubes 110, the flue gas stream 12 passes into convective section 114 of primary steam methane reformer 14. The flue gas stream 12 upon its entry into convective section 114 has a temperature of between about 600° C. and about 900° C. Flue gas stream 12 within convective section 114 passes through the exchangers 116, 120 and 122 to heat hydrocarbon containing reactant stream 102 and thereby to form hydrocarbon containing reactant stream 104, to superheat steam stream 98 to form steam stream 124 from vaporization of stream 68, and to boil second subsidiary stream 50 prior to being combined with stream 58. Flue gas stream 12 is discharged from the convective section 114 of steam methane reformer 14 at a temperature that is typically of between about 200° C. and about 350° C. Flue gas stream 12 then passes through a heat exchanger 125 to produce flue gas stream 24 for further processing or for carbon dioxide sequestration. Force draft is provided by a blower 126.

Air stream 128 or other oxygen containing gas is introduced into a blower 130 and then heated within heat exchanger 112 against the cooling of flue gas stream 12 to a temperature up to about 325° C. within heat exchanger 125. The resultant heated and compressed air stream is then divided into a first air stream 132 and a second air stream 134. First air stream 132 is further heated in a heat exchanger 136 to a temperature approaching an operating temperature of the oxygen transport membrane combustor 10, preferably to about 750° C. Oxygen transport membrane combustor 10 is provided with an oxygen transport membrane that is formed of a ceramic that is capable of conducting oxygen ions at elevated temperatures. Such devices are known in the art and an example of the utilization of such a device can be found in U.S. Pat. No. 5,888,272, discussed above.

The compressed and heated first air stream 132 is contacted with a retentate side 138 of oxygen transport membrane combustor 10. Oxygen ions permeate through the oxygen transport membrane employed in such device to permeate side 140. A fuel, such as natural gas stream 142, can be combined with a PSA (pressure swing adsorption) tail gas stream 144 at a molar ratio of about 1:47 and then introduced into the permeate side 140 of oxygen transport membrane combustor where it reacts with the permeated oxygen to form flue gas stream 12 which can be composed of about 49 percent by volume of carbon dioxide, about 46.8 percent by volume water, about 2 percent by volume nitrogen from the natural gas and about 1.5 percent by volume oxygen. The retentate stream 146, that is lean in oxygen, passes through heat exchanger 136 where it is cooled to about 750° C. and then heat exchangers 148 and 150. Heat exchangers 148 and 150 are used to successively heat third subsidiary stream 52 to form a steam stream 152 that is introduced into the steam header 76.

As mentioned above, first synthesis gas stream 16, produced by steam methane reformer 14, is introduced into oxygen transport membrane reactor 18. Oxygen transport membrane reactor 18 contains several oxygen transport membranes and optionally, a catalyst to promote partial oxidation and reforming reactions. Such reactors are also known and an example of the same can be found in U.S. Pat. No. 5,935,533. In this regard, the dominant reaction is reforming with the heat provided by the catalytic partial oxidation. Second compressed and heated air stream 134 is preheated in a heat exchanger 154 and then introduced to a retentate side 156 of oxygen transport membrane reactor 18. Oxygen ions are transported through the oxygen transport membranes where they react to provide the energy to reform or otherwise convert residual methane contained within first synthesis gas stream 16 at a permeate side 158 thereof to produce second synthesis gas stream 20. Oxygen transport membrane catalytic reactor operates at a temperature in the range of from 800° C. and about 1100 to drive the residual methane into additional hydrogen and carbon monoxide.

Second hydrocarbon containing reactant stream 108 is combined with additional steam provided by a steam stream 160. Steam stream 160 is formed from superheated steam stream 100 that is used in forming superheated steam stream 96. In this regard superheated steam stream 162 is divided out of superheated steam stream 100. A remaining superheated steam stream 164 is available for export purposes.

Gas heated reformer 22 is of known design and incorporates heat exchange tubes having a catalyst. The second hydrocarbon containing feed stream 108 and the additional steam provided by steam stream 160 undergo steam methane reforming reactions to produce a third synthesis gas stream 166. The third subsidiary synthesis gas stream 166 is combined with first synthesis gas stream 16 and the combined stream is then introduced into the retentate side 156 of secondary oxygen transport membrane catalytic reactor 18 to react further residual methane within third synthesis gas stream 166. The heat is provided for the steam methane reforming reaction conducted within gas heated reformer 32 by indirect heat exchange provided by second synthesis gas stream 20. Optionally, the second synthesis gas stream 166 can be combined with synthesis gas stream 20 after having transferred heat within the gas heated reformer 22. Although not illustrated, in any embodiment of the present invention, the second hydrocarbon containing feed stream could be heated by the flue gas stream 12 to provide part of the heat for such reforming. In the illustrated embodiment, the resultant second synthesis gas stream 20 forms a synthesis gas product stream 168.

The synthesis gas product stream 168 passes through heat exchanger 70 where it is cooled against boiling water stream 64 into steam. As a result, synthesis gas product stream 168 is cooled to a temperature suitable for a water shift reaction conducted within shift reactor 170 to produce a shifted gas stream 172 having more hydrogen than synthesis gas product stream 168. The shifted gas stream 172 passes through heat exchangers 86, 60, 54 and 36 and is cooled to about 100° F.

Thereafter, shifted gas stream 172 is then cooled within coolers 174 and 176. Shifted gas stream 172 is then introduced into a hydrogen pressure swing adsorption unit 175 that, as known in the art, contains several beds of adsorbents operating out of phase to separate hydrogen and produce a hydrogen product stream 177 in the tail gas stream 144. Tail gas stream could be used as make-up for the hydrogen stream 82 to be combined with natural gas feed stream 80.

Figure 2:
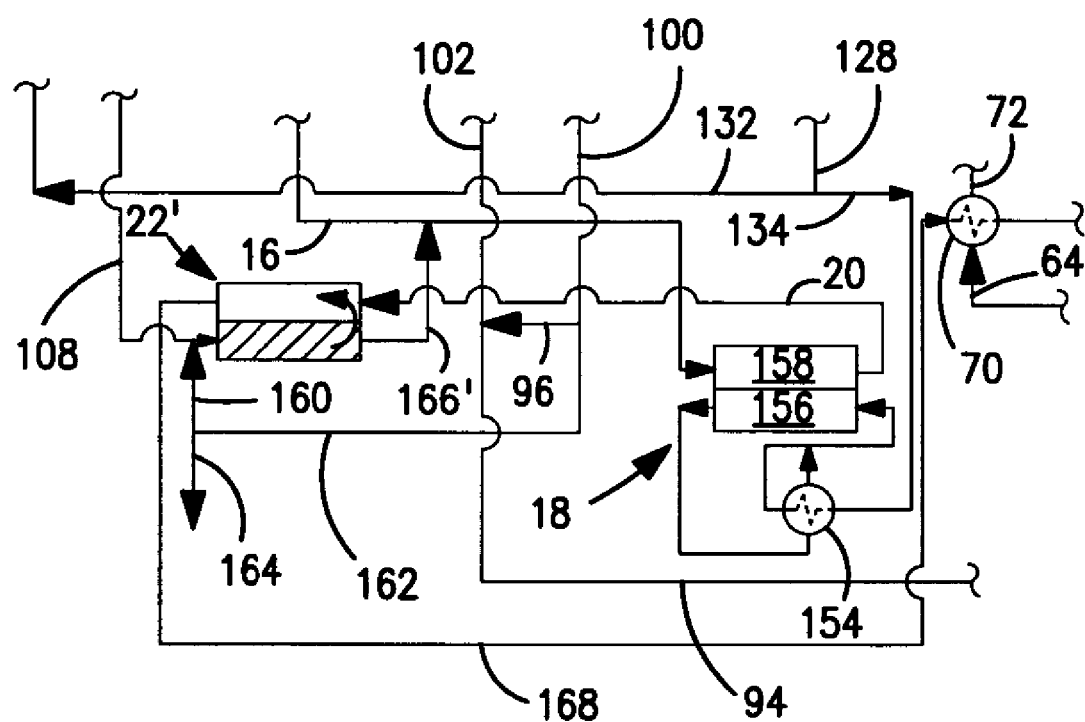
FIG. 2 is a fragmentary view of an alternative embodiment of FIG. 1 that is otherwise unchanged.

With reference to FIG. 2, an alternative embodiment is illustrated that differs from the embodiment illustrated in FIG. 1 in that third synthesis gas stream 166' is directly combined with second synthesis gas stream 20 upon its entry into gas heated reformer 22' that is modified for such purpose. In such embodiment, the synthesis gas product stream 168 is produced by a combination of third synthesis gas stream 166' and second synthesis gas stream 20.

Although the present invention has been described with reference to a preferred embodiment, as will occur to those skilled in the art, numerous changes, additions and omissions can be made without departing from the spirit and the scope of the present invention.

I claim:

1. A method of generating a synthesis gas product stream and carbon dioxide comprising:
    combusting a fuel in an oxygen transport membrane combustor to produce a flue gas stream containing the carbon dioxide and water;
    reacting part of a reactant stream, containing hydrocarbons and steam, in a combined reforming process and a remaining part of said reactant stream in a gas heated reformer to produce the synthesis gas product stream;
    the combined reforming process including a primary stage having a steam methane reformer to react part of the hydrocarbons and steam and a secondary stage having an oxygen transport membrane reactor configured to react residual methane produced in the primary stage through additional reforming and by catalytic partial oxidation;
    transferring heat from the flue gas stream to the primary stage and from the secondary stage to the gas heated reformer to support endothermic heat requirements of steam methane reforming reactions occurring within said primary stage and said gas heated reformer;
    cooling the flue gas stream; and
    separating water from the flue gas stream after having been cooled to produce the carbon dioxide at a concentration of at least 85 mol percent.

2. The method of claim 1, wherein:
    the primary stage produces a first synthesis gas stream, the first synthesis gas stream being introduced into the oxygen transport membrane reactor;
    the secondary stage produces a second synthesis gas stream; and
    the heat is transferred to the gas heated reformer by indirect heat exchange with the second synthesis gas stream.

3. The method of claim 2, wherein the flue gas stream is sufficiently cooled to condense the water contained therein and the water is separated from the flue gas stream by introducing the flue gas stream into a vessel to collect the water.

4. The method of claim 2 wherein:
    both the third synthesis gas stream and the first synthesis gas stream are introduced into the catalytic oxygen transport membrane reactor, thereby to react further residual methane present within the third synthesis gas stream along with the residual methane contained in the first synthesis gas stream and to obtain the second synthesis gas stream; and
    the synthesis gas product stream is formed from the second synthesis gas stream after having indirectly exchanged the heat to the gas heated reformer.

5. The method of claim 2, wherein:
    the third synthesis gas stream is combined with the second synthesis gas stream prior to the second synthesis gas stream indirectly transferring the heat to the gas heated reformer and a combined synthesis gas stream is thereby obtained from the gas heated reformer; and
    the synthesis gas product stream is formed from the combined synthesis gas stream.

6. The method of claim 4, wherein the flue gas stream is sufficiently cooled to condense the water contained therein and the water is separated from the flue gas stream by introducing the flue gas stream into a vessel to collect the water.

7. The method of claim 5, wherein the flue gas stream is sufficiently cooled to condense the water contained therein and the water is separated from the flue gas stream by introducing the flue gas stream into a vessel to collect the water.

* * * * *